United States Patent

[11] 3,604,274

| [72] | Inventors | Ansell W. Palmer<br>Hampton, N.H.;<br>Albert J. Leslie, York, Maine |
|---|---|---|
| [21] | Appl. No. | 875,245 |
| [22] | Filed | Nov. 10, 1969 |
| [45] | Patented | Sept. 14, 1971 |
| [73] | Assignee | General Electric Company |

[54] UNIFORM-TORQUE ESCAPEMENT MECHANISM
14 Claims, 5 Drawing Figs.

[52] U.S. Cl. .................................................. 74/1.5,
58/7, 58/116
[51] Int. Cl. ........................................................ F16h 27/04
[50] Field of Search ............................................. 74/1.5;
58/7, 116

[56] References Cited
UNITED STATES PATENTS

| 2,227,133 | 12/1940 | Hall ............................... | 74/1.5 |
| 2,480,865 | 9/1949 | Lofstrand ....................... | 74/517 |
| 2,678,570 | 5/1954 | Black ............................. | 74/1.5 |
| 2,871,702 | 2/1959 | Tetro ............................. | 74/1.5 |
| 3,416,075 | 12/1968 | Rutenberg ..................... | 324/113 X |

*Primary Examiner*—William F. O'Dea
*Assistant Examiner*—Thomas R. Hampshire
*Attorneys*—Francis X. Doyle, Vale P. Myles, Frank L. Neuhauser, Oscar B. Waddell and Joseph B. Forman ABSTRACT: A escapement mechanism for converting continuous rotary motion to a snap-action motion is provided with a drive spring which is placed in tension by rotation of a lever arm that has its effective torque transmitting length shortened as the spring tension increases so that the torque on the input drive means is maintained relatively uniform.

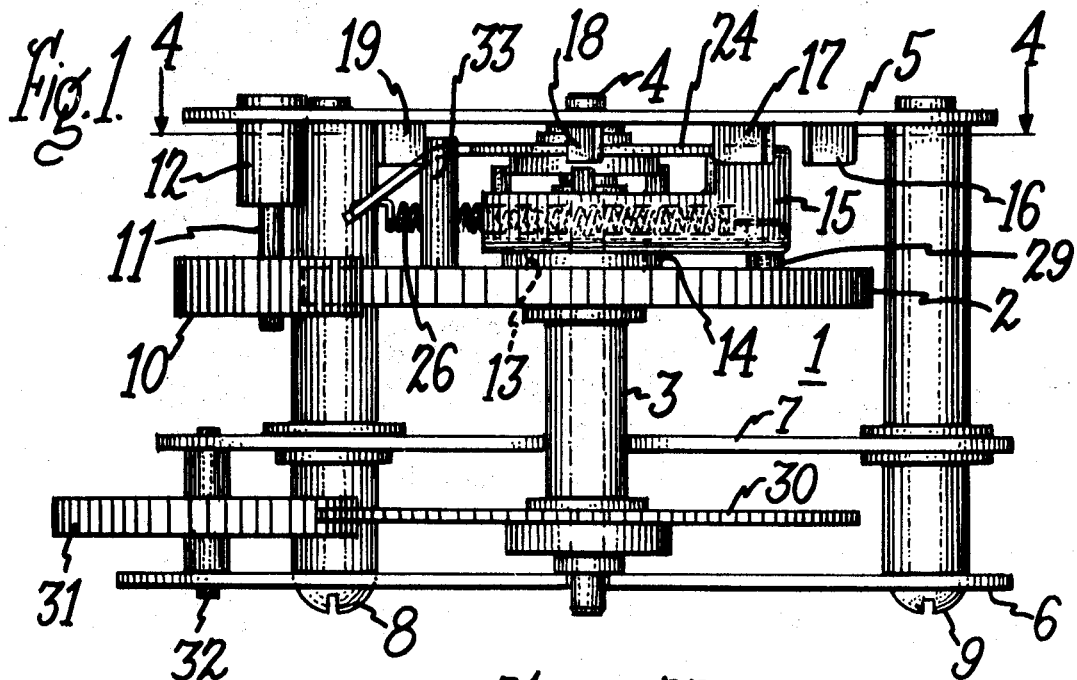
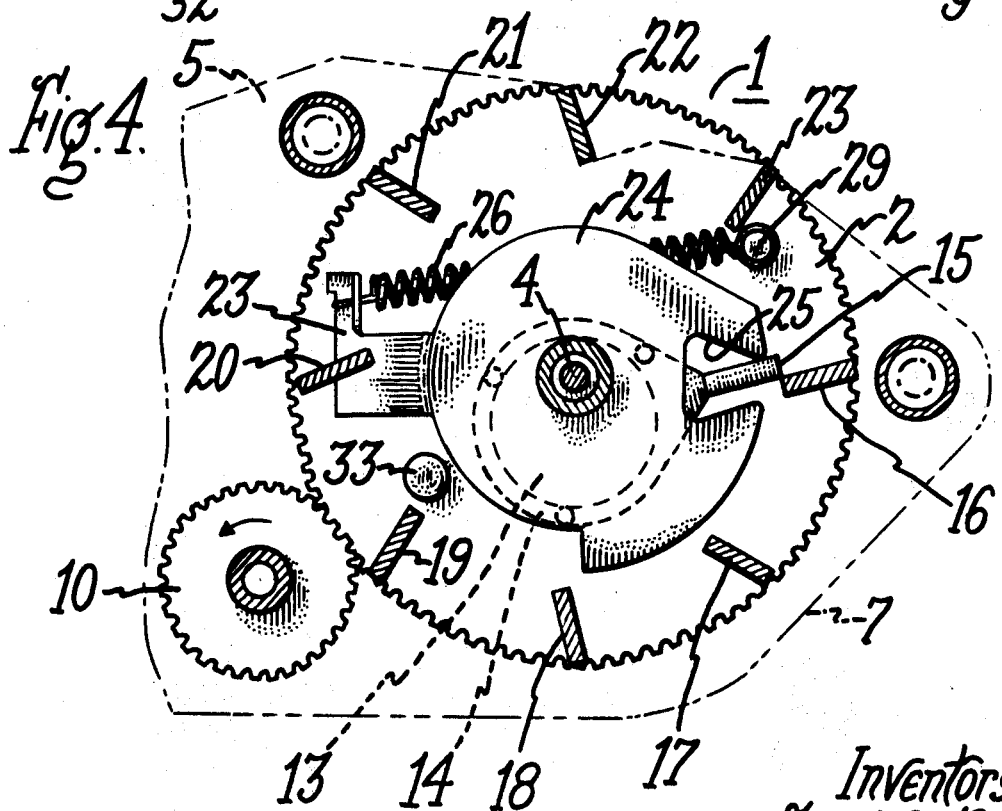

PATENTED SEP 14 1971

Inventors,
Ansell W. Palmer,
Albert J. Leslie,
by Vale P. Myles
Their Attorney.

3,604,274

UNIFORM-TORQUE ESCAPEMENT MECHANISM

Our invention relates generally to escapement devices, and more particularly to escapement devices that impart an intermittent, snap-action motion to associated control mechanisms, such as those used in combination with watt-hour meters to remotely indicate the position of indicating dials on such meters.

At the present time, there is considerable interest in developing systems for reading electric utility watt hour meters by remote means. Some current variations of such systems use electronic computers that can be temporarily coupled to individual meters of a power distribution system to derive input information from them. Conventional telephone links are used in such remote meter reading systems to afford the necessary temporary connections between computer and meter. However, it has been found that in order to use telephone links for transmitting data to indicate the power consumption measured by remotely positioned watt-hour meters, it is necessary to first reduce the data to a suitable electronic code that can be transmitted over the telephone links of the system.

As is known by those skilled in the art, an electric watt-hour meter continuously measures and registers the amount of power consumed by a circuit in which it is connected. A record of such power consumption is usually stored by the meter on a dial made the respective dials of which are coupled to gears of a gear train driven by the watt-hour meter. Various encoder means have already been developed for translating an indication of power consumption registered on such a watt-hour meter's rotary dials into electronic signals that can be successfully transmitted over a telephone link. Of course, a detailed description of such encoders need not be given here, because they do not form a necessary part of the present invention. However, it can be noted that it has been found that for such encoders to be successfully utilized; they must be made to reflect a meter reading at the precise time that a given meter's encoder is queried by the remotely positioned computer. Due to this requirement, it is suggested that a suitable escapement mechanism be utilized as a transducer between the continuous rotary drives of each watt-hour meter on the system and the respective inputs to such encoders so that the encoders are programmed in a digital manner with specific increments of information that can be fed to a computer. Of course, a basic requirement for such an escapement mechanism is that it be readily adaptable to use with watt-hour meters without requiring recalibration of the meters.

Escapement mechanisms which convert relatively continuous rotary motion to a series of snap-action movements are known in the prior art. An example of such a prior art escapement is illustrated in U.S. Pat. No. 2,871,702 issued Feb. 3, 1959 and assigned to The E. Ingraham Co. of Bristol, Conn. The escapement disclosed in this prior art patent has a disadvantage, that is similar to that found in many other escapement mechanisms, because it incorporates a torsion spring that is loaded by continuous movement of an input drive shaft. As the tension on the spring is increased, the coupling mechanism transmits a directly proportional increase in torque back to the input drive shaft. Thus, the force of torsion exerted on the input by the escapement mechanism varies substantially during each stepping action of the escapement device. Such uneven loading is not suitable for a watt-hour meter encoding application of the type suggested above, because it would necessitate recalibration of the meters with which the escapement were used.

A primary object of our invention is to provide an escapement device that converts a rotary input motion to a snap-action output motion while applying relatively uniform torque to the rotary input means.

Another object of the invention is to provide an escapement mechanism with a stop-limit means that prevents overdriving of a spring member when the mechanism is driven in the reverse direction beyond a predetermined limit.

Yet another object of the invention is to provide an improved escapement mechanism that is simple to manufacture and is sturdy in construction so that it affords dependable, maintenance free service over a number of years at least equivalent to the expected life span of commercial watt-hour meters.

A further object of the invention is to provide an escapement mechanism that can be easily coupled to the gear train of a watt-hour meter and driven thereby without requiring recalibration of the meter to enable it to continue measuring power consumption within limits of accuracy presently established by the electric utility industry.

Other objects and advantages of the invention will become apparent from the description of it that follows.

Briefly stated, in one preferred form of our invention, an escapement mechanism having a rotatably mounted input disc gear is provided with a second rotatable gear mounted on a separate shaft. The first gear is coupled to the second gear through a lever mechanism and a resilient spring that allows the first gear to be driven at a constant speed by a pinion coupled to a watt-hour meter gear train, while the second gear advances intermittently with a snap action. The spring is loaded by movement of the first gear when the second gear is stopped, then the spring transmits a driving force to the second gear and moves it forward, when it is released for such forward movement by a braking element. A characteristic feature of the invention is its unique coupling of the lever and spring driving arrangement, to maintain a generally constant torque at the input of the mechanism, during each entire cycle of the escapement mechanism so that a watt-hour meter, by which it is driven, is uniformly loaded.

In the drawings:

FIG. 1 is a side elevation of an escapement mechanism constructed pursuant to our invention.

FIG. 4 is a top plan view, partly in cross section, taken along the plane 4—4 in FIG. 1, illustrating the escapement mechanism of our invention at a point in its operating cycle just prior to release of its braking element from a stop member.

Figure 2:
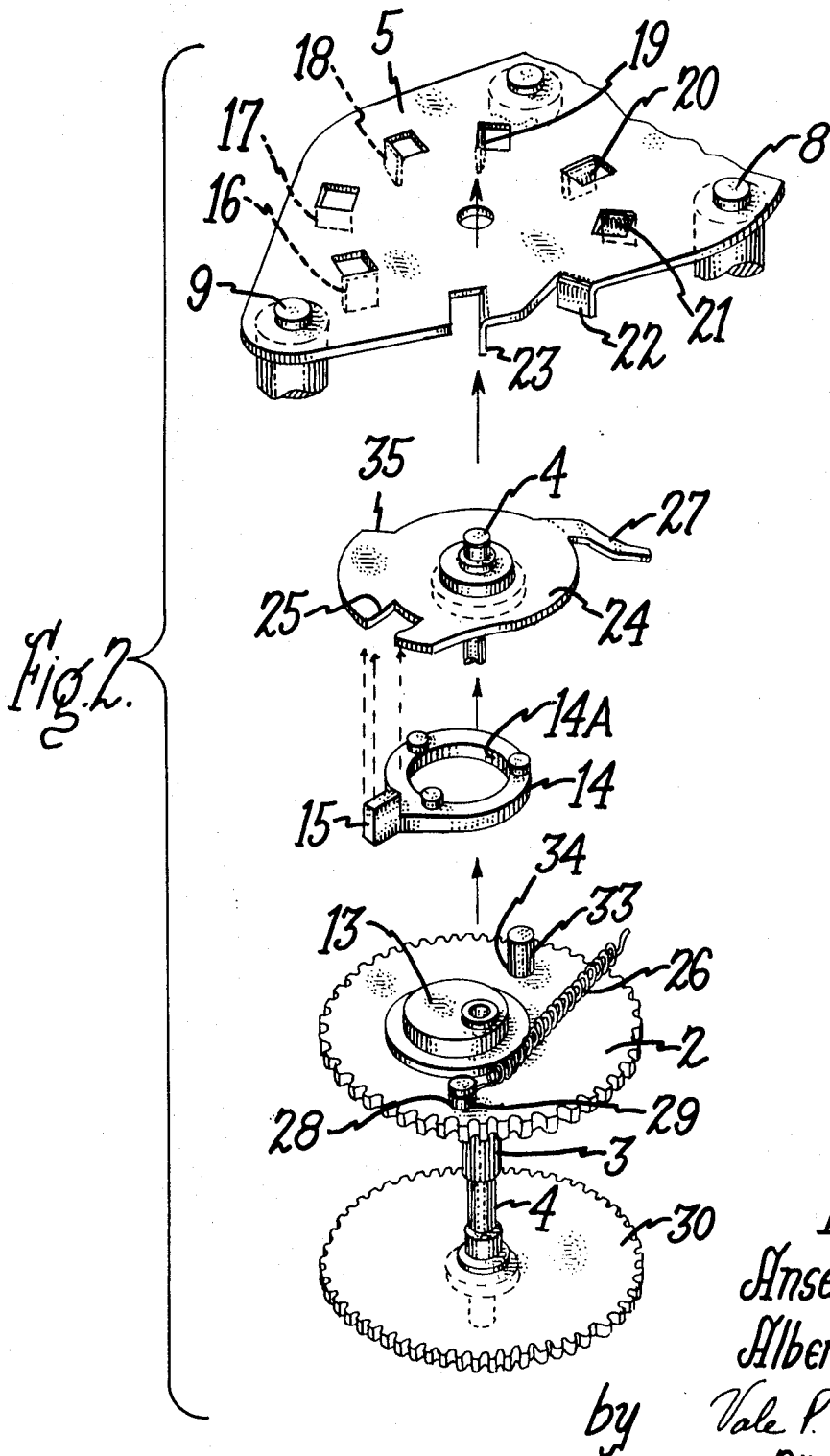
FIG. 2 is an exploded, perspective view of the main operating parts of the escape mechanism illustrated in FIG. 1.

Referring now to FIGS. 1 and 2 of the drawing, there is shown an escapement device 1 constructed pursuant to our invention. The escapement device 1 comprises a first rotatable member 2 which, in the preferred form of the invention illustrated, is a gear disc having a plurality of equally spaced teeth around its peripheral edge. In order to rotatably support the gear disc 2, it is mounted in fixed relation on a hollow shaft 3, which in turn is concentrically positioned around an axle 4 and adapted to rotate with respect to this axle. A suitable frame comprising two metal end plate members 5 and 6, a central supporting metal plate 7 and any desired number of spacing and holding bolts (two of which are shown at 8 and 9), is provided for mounting the axle 4 so that it and the shaft 3 rotate around substantially aligned, fixed axes.

A pinion gear 10 rotatably mounted on a shaft 11 which is suitably journaled in a bearing 12 that is fixed on plate member 5, is provided to afford a drive means for rotatable gear 2, with which it is meshed. It will be understood that pinion gear 10 can be driven by one or more gears in a gear train of a watt-hour meter or other suitable power input mechanism. Also mounted adjacent rotatable gear 2 and in fixed relationship therewith is a cam means 13 that comprises a generally circular shaped abutment above the surface of gear disc 2, as seen in FIGS. 1 and 2. The cam means 13 is eccentric from the fixed axis of rotation of the gear disc 2, as can perhaps be best seen by referring to FIGS. 2, 4 and 5 of the drawing. A cam follower member 14 is mounted in contact with the cam means and comprises a central body portion having a generally circular aperture 14A therein that is adapted to slide rotatably about the cam means 13 in a manner that will be described in greater detail below. An integral part of the cam follower 14 is a braking element 15 positioned at one extreme end of the cam follower and forming an integral abutment thereon. As will be described later in connection with the operation of the invention, the braking element 15 is adapted to intermittently contact a plurality of stop members 16-23 (also shown in FIGS. 4 and 5 in cross section) to control the movement of the braking element 15 in a manner consistent with the operation of our invention. In the preferred form of the invention illustrated herein, the stop elements 16-23 are formed by punching tabs in the metal plate member 5 as is shown best in FIG. 2 of the drawing.

Cam follower member 14 is operable by the cam means 13 to move the braking element 15 in a reciprocating motion toward and away from the fixed axis of rotation of rotatable member 2. Therefore, the angular movement of braking element 15 is arrested only when this element 15 is in a predetermined portion of its range of reciprocal movement such that it contacts one of the stop members 16-23. In the preferred form of the invention, the braking element 15 is arranged to contact one of the stop members 16-23 when the braking element 15 is at any point within 80 percent of its reciprocal range of movement at the end of that range most distant from the fixed axis of rotatable member 2.

It should be understood at this point that although stop members 16-13 are arranged on the centerline of a circle concentric with the fixed axis of rotatable member 2 in this embodiment of the preferred embodiment of the invention, in other embodiments it may be desirable to space the stop members at different radial distances from a fixed axis. Also, in other embodiments of the invention, it may be desirable to have a greater or lesser number of stop members, or to vary the interval of time that braking element 15 engages any one of such members by varying the degree of contact within the reciprocal range of movement of braking element 15 during which such a stop member is in engagement with the braking element 15. In still another embodiment, the angular distance between the stops for element 15 can be varied to give desired variation in output angular travel. Of course, all such modifications are encompassed within the spirit and scope of our invention.

Mounted on axle 4, in fixed relation thereto, adjacent its uppermost end, as seen in FIGS. 1 and 2, is a lever 24 that is rotatable with the axle 4. Mechanical coupling means comprising means defining a passageway 25 in one peripheral edge of lever 24, adapted to receive therein the portion of braking element 15 that forms an abutment extending upwardly from the uppermost surface of cam follower 14, is provided to couple-braking element 15 in braking relation to the lever 24, so that braking element 15 prevents movement of the lever 24 when the braking element is in position against one of the stop members 16-23.

An elongated resilient member 26, in the form of a coil spring, is connected at one of its ends to lever 24 adjacent the end thereof remote from passageway 25, by hooking a loop at the end of spring 26 over the end of a preformed arm 27 on lever 24. The other end of resilient spring member 26 is fastened in any suitable manner to a point 28 on rotatable member 2 that is a predetermined radial distance from the fixed axis of rotatable member 2. In the preferred form of the invention, a pin 29 is mounted in any suitable manner on rotatable member 2 at the point 28 and a loop at the end of spring 26 is engaged around the pin 29 to secure it in position with respect thereto.

A second rotatable member 30, in the form of a disc gear in the preferred embodiment of the invention, is mounted on axle 4 in fixed relation thereto, adjacent its lowermost end, as shown in FIGS. 1 and 2. Disc gear 30 is coupled in driving relation with an output gear 31 that is rotatably mounted on an axle 32 supported between frame plates 6 and 7. It will be understood that gear 31 can serve as the input mechanism for any device, such as an encoding mechanism of the type discussed above, which requires intermittent, snap-action rotation to perform its desired function.

In addition to the primary driving components of escapement 1 described thus far, which are operable to convert a relatively constant input rotary motion to disc gear 2 into a snap-action output motion of gear disc 30, our escapement device includes a limit-stop means comprising an abutment 33 (see FIG. 2) on the upper surface of rotatable member 2. In the preferred form of the invention, this abutment 33 is a pin that is press-fit into an aperture 34 in rotatable member 2. The abutment 33 is positioned in relation to lever 24 in a manner such that it prevents more than a desired predetermined relative movement between the rotatable member 2 and the lever 24 in either a forward or reverse direction. This particular operation is performed by abutment 33 engaging surface 35 on lever 24 when the lever is rotated in a forward direction with respect to rotatable member 2, or by engaging the back of arm 27 if lever 24 reverses and the output train does not advance for any reason. The operation of this feature of the invention is fully described below.

Figure 3:
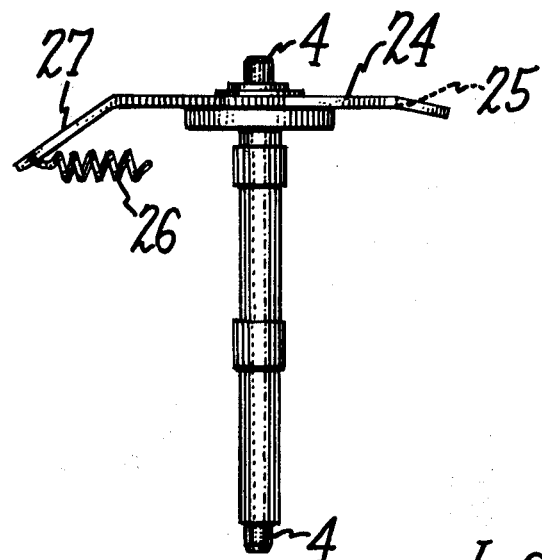
FIG. 3 is a side elevation of a drive shaft and lever arrangement utilized in the escapement mechanism illustrated in FIGS. 1 and 2.

Another feature of our invention that should be clearly understood is the relative position or arm 27 with respect to the remainder of its integral lever 24. By referring to FIG. 3 of the drawing, it can be seen that arm 27 is formed so that the plane in which it moves is different than that in which the end of lever 24 containing passageway 25 moves; thus, the resilient tensioning member 26 can move toward the fixed axis of axle 4 without contacting or being obstructed by the lever 24 adjacent its midpoint. As will become apparent from the description of the mode of operation of the invention that follows, this feature is important because it helps assure the uniform torque transmitting operation of the invention.

Figure 5:
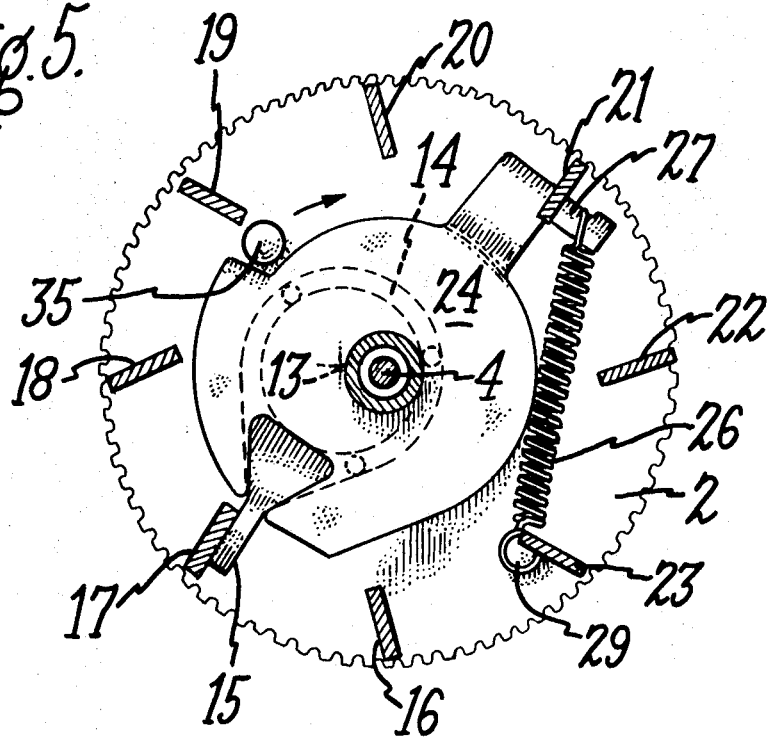
FIG. 5 is also a top plan view of the same escapement mechanism shown in FIG. 1, taken along the plane 4—4 in FIG. 3, but illustrating the operating elements of the mechanism in a part of their operating cycle wherein the braking element of the mechanism has just engaged a stop element.

The operation of the preferred embodiment of our invention illustrated herein will now be described with particular reference to FIGs. 4 and 5. FIG. 4 depicts the operating components of escape mechanism 1 in one of the positions they will attain just prior to release of braking element 15 from one of the stop members 16, at which point the braking element 15 will be freed to move forward with a snap-action into braking engagement with the next successive stop member 17. It will be understood that to attain the position shown in FIG. 4, the input drive gear 10 was driven in a counterclockwise direction, as shown by the arrow in FIG. 4, to reflect a predetermined measurement of power consumption recorded by a watt-hour meter to which it is coupled. This driving movement of gear 10 forces gear disc 2 to rotate in a clockwise direction with respect to fixed plate member 5 and the stop members 16-23 forming an integral part thereof. As disc gear 2 continues to rotate, it loads spring member 26 in tension, because one end of spring 26 is mounted on pin 29 while the other end of spring 26 is held stationery by arm 27 on lever 24, which, in turn, is prevented from moving by braking element 15. Simultaneous with the loading of spring 26, rotation of disc gear 2 causes cam means 13 to rotate eccentrically around the fixed axis of rotation of axle 4 so that it, in turn, causes cam follower 14 and its integral abutment braking element 15 to move inward in its reciprocal range of movement toward the fixed axis of axle 4. When braking element 15 reaches the position shown in FIG. 4, it is free to move past stop member 16. At this point in the operating cycle, the driving action of extended coil spring 26 forces lever 24 to rotate forward in clockwise direction with a snap-action. As lever 24 advances in this manner, it rotates cam follower 14 around cam means 13 and thereby forces braking element 15 to move outward in its reciprocal range of movement to a point where it engages the next successive stop member 17 and is arrested by it. At the same time, the axle 4 on which arm 24 is rigidly mounted, if forced to rotate with a snap-action and thus imparts this snap action rotary movement to the second rotatable disc gear 30. As mentioned above, disc gear 30 is coupled in driving relation with output gear 31; accordingly, it can be seen that the relatively continuous input movement of drive gear 10 has been transduced to a rotary snap action of output gear 31 by the unique action of the preferred embodiment of our escapement device 1. It will be appreciated that the foregoing cycle of operation will be repeated as long as drive gear 10 continues to rotate disc gear 2 in a clockwise direction, so that the braking element 15 is moved successively between the stop members 18, 19, 20, etc.

In order to prevent the spring 26 from becoming overextended; and also to prevent braking element 15 from being moved completely out of passageway 25 in lever 24, the stop-limit means in the form of pin 33 mounted on disc gear 2 is positioned to come in engagement with the trailing edge of arm 27 if for some reason lever 24 is driven in a reverse direction, or arrested in its forward movement while rotatable disc gear 2 continues to advance. In like manner, pin 33 engages surface 35 on lever 24 if lever arm 24 is rotated beyond it desired predetermined range in a clockwise direction, as might occur, for example, if braking element 15 is damaged and does not arrest the forward movement of lever 24.

Now that the operation of our invention is understood, it is important to note that the unique mounting arrangement of drive spring 26 serves to partially eliminate wide variation in the torque loading of drive gear 10 as the escapement mechanism 1 moves through its repetitive snap-action cycles. Specifically, as can be seen by referring to FIGS. 4 and 5, the effective lever arm defined by the radial path between the fixed axis of rotation of the axle 4 and pin 29, is shortened simultaneous with the increase in tension loading of spring 26. In other words, as is clearly shown by the relative positions of spring 26 in FIGS. 4 and 5, as spring 26 is extended to a point where it exerts its maximum tension force, the pin 29 is rotated to a position such that spring 26 is moved toward the axle 4. Accordingly, the effective lever arm between axle 4 and pin 29 is shortened to offset the increase in tension force in spring 26 and maintain a relatively constant reverse torque on drive gear 10. This smoothing of the reverse torque on drive gear 10 is particularly important when, as in the preferred application of our invention, drive gear 10 is part of the gear train of a watt-hour meter, because it obviates the necessity of recalibrating the meter to compensate for a more erratic type of loading that might be obtained with other escape mechanisms.

It will be understood by those skilled in the art that numerous modifications and other embodiments of our invention can be constructed based on the teachings given above of the preferred structure and operation of the invention, which particularly adapts it for use with a watt-hour meter. Of course, all such modifications and embodiments should be deemed to fall within the true scope and spirit of the invention.

What we claim as new and desire to secure by Letters Patent of the United States is:

1. An escapement device comprising a first rotatable member mounted to rotate around a fixed axis, drive means coupled to rotate said rotatable member, cam means mounted adjacent said rotatable member in fixed relationship therewith whereby said cam means rotates in unison with the rotatable member, a cam follower member mounted in contact with the cam means, a braking element positioned on said cam follower member, said cam follower member being operable by said cam means to move the braking element in a reciprocating motion toward and away from the fixed axis of rotation of said rotatable member, a plurality of stop members mounted in relatively fixed relation at spaced points around said fixed axis such that the braking element moves into contact with each of said stop members and has its angular movement arrested thereby only when said braking element is in a predetermined portion of its range of reciprocal movement, a rotatably mounted lever, mechanical coupling means connected to couple said braking element in braking relation to said lever whereby the braking element prevents movement of said lever when the braking element is positioned against one of said stop members but frees said lever to rotate when the braking element is moved between said stop members, an elongated resilient member adapted to be loaded in tension, said resilient member being connected adjacent one end thereof to said lever and adjacent the other end thereof to a point on said first rotatable member a predetermined distance from said fixed axis, whereby said resilient member is loaded in tension by rotation of the first rotatable member when said lever is prevented from moving by the braking element, a rotatably mounted axle, a second rotatable member mounted on said axle for rotation therewith, said lever being rigidly connected to the axle in fixed driving relation with said axle whereby said second rotatable member is rotated in response to movement of said lever when the braking element is moved by the cam follower beyond said predetermined portion of its range of reciprocal movement and thereby frees the lever to rotate and the lever is caused to rotate by the force exerted upon it by said resilient member.

2. An escapement device as defined in claim 1 wherein said predetermined portion of the range of reciprocal movement of said braking element includes 80 percent of the reciprocal range of movement of said braking element at the end of said range most distant from said fixed axis.

3. An escapement device as defined in claim 1 wherein said point on the first rotatable member to which the resilient member is connected is positioned relative to said stop members so that the vertical distance between said resilient member and said fixed axis is at a maximum when the resilient member is unloaded and at a minimum when the resilient member is loaded to its maximum tension, whereby the effective torque transmitting lever arm between the fixed axis of said rotatable member and said point is shortened progressively as the resilient member is loaded in tension.

4. An escapement device as defined in claim 1 wherein the longitudinal axes of said fixed axis and said axle are substantially in alignment.

5. An escapement device as defined in claim 1 wherein said braking element comprises an integral abutment on said cam follower member adjacent one end of said member.

6. An escapement device as defined in claim 5 wherein said mechanical coupling means comprises means defining a passageway adapted to receive a portion of said abutment therein, said means defining a passageway being positioned in fixed relation with respect to said lever, and said abutment being reciprocally movable in said passageway within said predetermined range of reciprocal movement.

7. An escapement device as defined in claim 6 wherein said means defining a passageway comprises a slot formed in said lever adjacent the end thereof remote from the end connected to said resilient member, and wherein said lever is shaped to position the sides of said slot in a plane different than the plane in which the end of the lever connected to said resilient member moves, whereby said tensioning member can move toward said fixed axis without contacting said lever adjacent its midpoint.

8. An escapement mechanism as defined in claim 1 wherein said first rotatable member comprises a gear disc and said drive means comprises a gear train of a watt-hour meter connected in driving relation with said gear disc, whereby said gear disc is rotated at a constant speed and said second rotatable member is rotated with a snap-action as said braking element advances from one stop member to the next.

9. An escapement mechanism as in claim 8 wherein said resilient member comprises a coil spring.

10. An escapement mechanism as in claim 6 including limit-stop means comprising an abutment on said first rotatable member positioned to be engaged by said lever when the resilient member is unloaded, said abutment on the first rotatable member being effective to prevent more than predetermined relative movement between said first rotatable member and said lever in one direction, whereby said abutment on the cam follower member is prevented from completely leaving said passageway.

11. An escapement device comprising a rotatably mounted shaft, a first gear disc mounted on said shaft for rotation therewith, a unidirectional drive mechanism including a pinion gear mounted in driving relationship with said gear disc, whereby said gear disc is rotated by the operation of said drive mechanism, a rotatably mounted axle, an output member rigidly mounted on said axle for rotation therewith, a lever mounted in fixed relation on said axle for controlling movement thereof, a resilient member connected between said first gear disc and said lever to transmit a driving force to the lever responsive to movement of the first gear disc by said drive mechanism, and braking means mounted for radial movement with relation to said lever and operable to periodically arrest movement of said lever while the first gear disc rotates through a predetermined angular displacement and further operable to release said lever for movement through a predetermined angular displacement responsive to the driving force of said resilient member, whereby the rotary movement of said pinion gear is converted to a snap-action movement of said output member, the extent of which is controlled by said braking means.

12. An escapement device as in claim 11 wherein said braking means comprises a plurality of stop members mounted peripherally around said shaft at predetermined radial distances therefrom on a separate support means, and a braking element positioned adjacent a first end of said lever and actuated by a cam mechanism driven by said first gear disc.

13. An escapement device as in claim 12 wherein said resilient member is a coil spring, the respective ends of which are fastened to a point on said lever adjacent the end thereof opposite said braking element, and to a spring-holding means mounted at a predetermined point on said first gear disc spaced radially outward from said shaft.

14. An escapement device as in claim 13 including a stop-limit means that cooperates with the braking means to prevent said spring from being moved into contact with said shaft.